INVENTOR.
NORMAN B. MURPHY
BY Herbert L. Davis
ATTORNEY

INVENTOR.
NORMAN B. MURPHY

June 11, 1963  N. B. MURPHY  3,093,121
MECHANICAL PHASE COMPENSATOR FOR CASCADE SERVO SYSTEM
Filed Sept. 15, 1961  5 Sheets-Sheet 5

INVENTOR.
NORMAN B. MURPHY
BY Herbert L. Davis
ATTORNEY

United States Patent Office 3,093,121
Patented June 11, 1963

3,093,121
MECHANICAL PHASE COMPENSATOR FOR
CASCADE SERVO SYSTEM
Norman B. Murphy, Tenafly, N.J., assignor to The Bendix
Corporation, Teterboro, N.J., a corporation of Delaware
Filed Sept. 15, 1961, Ser. No. 138,399
5 Claims. (Cl. 121—41)

This invention relates generally to control systems for aircraft whose operative surfaces are hydraulically operated and are actuated manually and automatically, and more particularly to a mechanical phase compensator, for use with an automatic control system in cascade with a manual control system, to match linear servo output with a non-linear transfer valve or to match a linear high response transfer valve for human pilot operation.

In an aircraft control system having fluid operated power means, characteristics of the transfer valve for the power means is such that, when the transfer valve is designed for optimum manual operation, the design usually does not permit optimum automatic operation. Conversely, when the transfer valve is designed for optimum automatic operation, the design usually does not permit optimum manual operation.

In particular, the transfer valve is connected to the aircraft controls such that by movement of the controls in one direction, fluid is metered under pressure to one end of a power ram which is connected to the control surface of the aircraft. Movement of the controls in one direction results in the control surface moving in one direction and when the controls are moved in the opposite direction, fluid flow is reversed and the control surface moves in the opposite direction. Transfer valves designed for manual control take into account the combination of surface effectivity and the sensitivity in flight to manual control. Thus in a transfer valve designed for manual operation, the relationship of flow of operating fluid to the power ram plotted against valve travel may be non-linear; the non-linearity being pronounced in the area through, and approaching hydraulic zero. In contrast, a transfer valve designed for automatic pilot operation requires that the fluid flow to the ram be linearly proportional to a differential current applied to the first stage of an electro-hydraulic servo valve. This is because most automatic pilot systems require high sensitivity of the servo loop and that the output of the automatic pilot be proportional, in a linear relationship, to an error signal or feedback signal measured from the automatic pilot servo output.

A problem is created in the control of an aircraft in which the human pilot and the automatic pilot may alternatively control the same transfer valve. The problem becomes acute when an automatic pilot is placed in parallel with the manual controls of an aircraft, such that the linear servo system of the automatic pilot drives the non-linear transfer valve designed for human control. It can be seen then that automatic pilot servo displacement and control surface displacement will not be maintained in linear relationship over the range of servo travel, but will vary with the amplitude of the servo output. For such a system to be stable, either complicated electric circuitry must be added to provide gain change with amplitude; or the slope of the gain curve of the automatic pilot servo has to be reduced to a point where it approaches the minimum slope of the gain of the manual control valve thereby making a high response system impractical. Alternative solutions employ duplicate parallel hydraulic control systems as described in U.S. Patent No. 2,940,428, granted June 14, 1960 to Jack Brandstadter and assigned to Bendix Aviation Corporation.

Likewise, if the transfer valve is designed for optimum performance with an automatic pilot, the human pilot upon taking control of the craft may find it difficult to hold the craft in straight and level flight.

An object of the present invention is to provide a mechanical means to make a transfer valve of an aircraft compatible for either manual or automatic control.

Another object of the present invention is to provide a simple, mechanical means to make an automatic pilot output compatible with a transfer valve designed for non-linear operation.

Another object of the present invention is to provide a simple, mechanical means to make a manual pilot control compatible with a transfer valve designed for automatic pilot operation.

Another object of the invention is to provide a novel mechanical phase compensator mechanism including novel cam means and cooperating structure to effect a predetermined displacement of an output member relative to an input member.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

Figure 1:
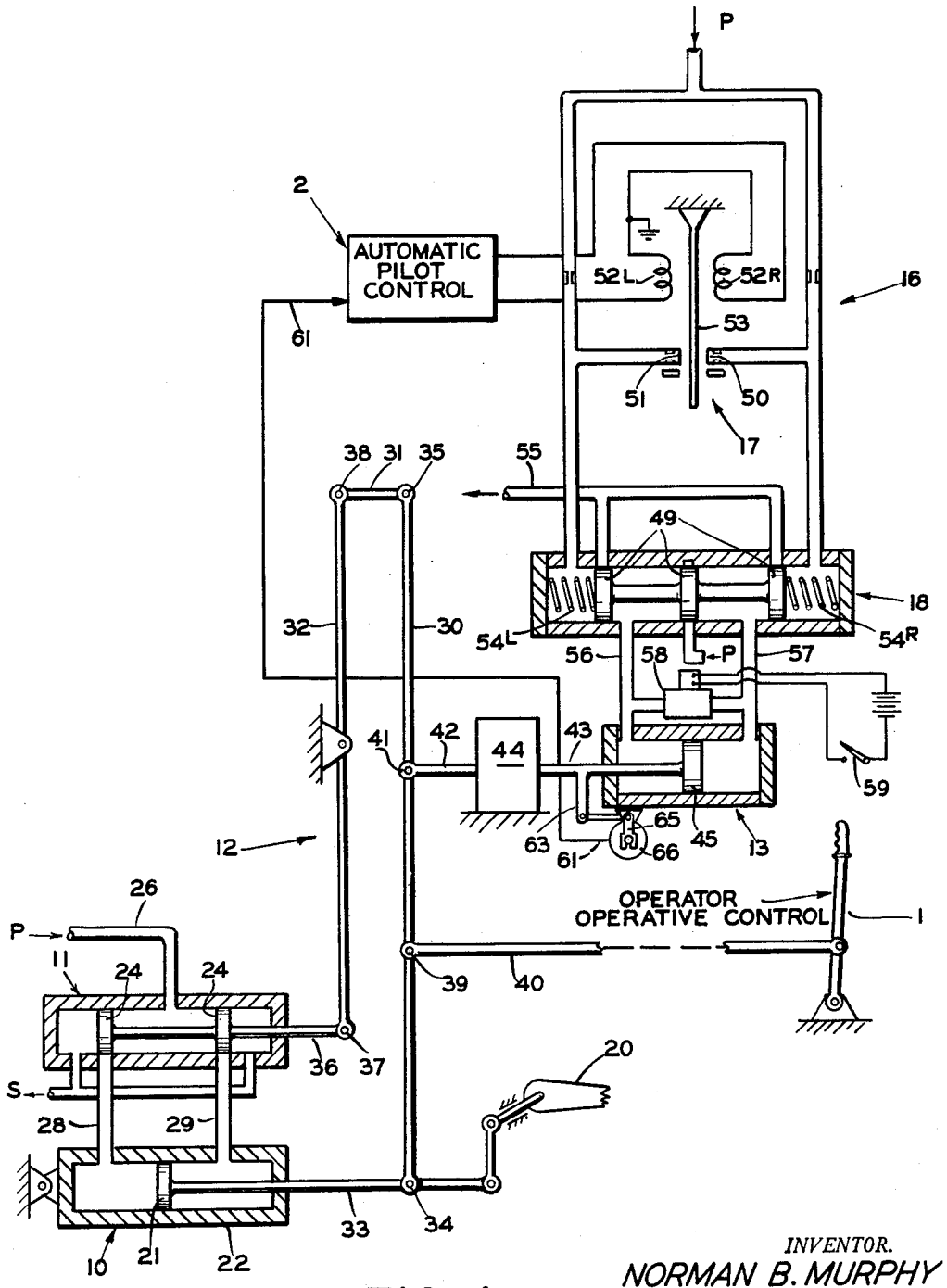
FIGURE 1 illustrates schematically an aircraft control system embodying the present invention.

Referring to FIGURE 1, there is illustrated schematically an aircraft control system embodying the present invention. The system is comprised generally of an operator-operative control 1 and an automatic pilot control 2 operatively connected to a power ram 10 through a transfer valve 11, a differential linkage 12, a servo ram 13, and an electro hydraulic servo valve 16 having first and second stages 17 and 18. The source of pressure fluid P and the sump S are conventional and are not shown.

The power ram 10 is arranged to operatively position a control surface 20. The power ram 10 may be of conventional type including a piston 21 in a cylinder 22. The movement of a spool 24 in the transfer valve 11 controls ram 10 by regulating the flow of fluid pressure medium P from a conduit 26 to the conduits 28 or 29, which lead to either side of piston 21.

Differential linkage 12, which positions spool 24 is comprised of linkage members 30, 31, and 32. Member 30 is pivotally connected to shaft 33 of piston 21 by pin 34, and to member 31 by pin 35. Member 32 is pivotally connected to shaft 36 of spool 24, by pin 37 and to member 31 by pin 38. Member 30 is pivotally connected by pin 39 to rod 40 which is in turn connected to the manual or human pilot operated controls of the aircraft illustrated by the lever entitled operator-operative control 1. Member 30 is also pivotally connected by pin 41 to rod 42 which is connected to the output of an automatic pilot servo rod 43, through a novel cam 44 which is the subject matter of the present invention.

The operation of either the operator-operative control 1 or the automatic pilot control 2 effects the displacement of rods 40 and 42 and pivots member 30 about pin 34. Member 31 links members 30 and 32 so that member 32 controls actuation of rod 36. Actuation of the rod 36 moves spool 24 to the right or left, depending upon the direction of the input displacement of rod 42 or 40 and permits the pressure fluid to flow to one side of piston 21. Piston 21 moves until the reposition of pin 34 is such that the linkage 12 again centers spool 24. Surface 20, at this time, has been moved to the position called for by the pilot's controls, and the displacement of the surface stops.

The input to the differential linkage 12 may be effected by either a human pilot 1 along shaft 40 or through shaft 42 by the automatic pilot 2.

When the automatic pilot controls the aircraft, the servo ram 13, or output of the electro-hydraulic servo valve 16 moves the rod 43 operatively connected through the cam mechanism 44 to the input shaft 42 of the differential linkage 12.

The electro-hydraulic servo valve 16 may be conventional and of the type described in U.S. Patent No. 2,625,136. In the present embodiment, the first stage has an armature 53 and a flap valve portion operated thereby to control orifices 50 and 51. Armature 53 is moved in response to output from the automatic control system 2. To this end, a pair of coils $52^R$ and $52^L$ surrounding armature 53 are differently energized in a direction and in an amount corresponding to the phase and amplitude of the signal from the automatic pilot control system 2; which are in response to follow up signals and flight conditions of the aircraft as sensed thereby. The valve portion 17 of the electro-hydraulic servo valve 16, when centered, stabilizes spool 49 in a center position through the action of the orifices 50 and 51. The movement of the armature 53 in one direction or the other from center position sets up a differential pressure in chambers $54^L$ and $54^R$, correspondingly moving spool 49 to the right or to the left, and movement of spool 49 controls the flow of pressure fluid from conduit 55 through conduit 56 or 57 to either side of piston 45 located in the servo ram 13.

A solenoid operated by-pass valve 58 is rendered effective upon the operator closing the switch 59 to interconnect the lines 56 and 57 so as to by-pass the control spool 49 and render the operator-operative control effective for manual operation of the transfer valve 11 through the linkage 12 while upon the operator opening the control switch 59 the valve 58 is rendered effective to close the by-pass connection between the lines 56 and 57 and render the automatic pilot 2 effective to control the transfer valve 11.

An error or follow up signal is fed along conductor 61 to the automatic pilot 2 from synchro 66 operated by the output rod 43 through arm 63 of the servo ram 13 operatively connected to an input shaft 65 of the synchro 66; as explained, for example, in U.S. Patent No. 2,940,428; this signal being proportional to the displacement of the servo output rod 43.

Stable operation of a high response automatic pilot system requires the error or follow up signal and the rate of the automatic pilot electro-hydraulic servo output (rate of travel of shaft 43), be proportional to the differential current applied to winding $52^R$ or $52^L$ of armature 53 of the automatic pilot electro-hydraulic servo valve 16.

Moreover, stable operation of the high response automatic pilot system requires the rate of displacement of the control surface 20 (or flow of fluid pressure medium to the power ram 10) have a substantially linear relation to the differential current applied to the armature 53.

Thus, if we plot a graph of flow of the fluid pressure medium to the ram 20 in gallons per minute, as a function of the differential current applied to the first stage armature 53, the high response automatic pilot system would require that the relationship be substantially linear. Such a graph, for a typical auto pilot, is shown in FIGURE 2 and is indicated thereon as curve A.

On the other hand, a manual control system may be designed such that the rate of displacement of the control surface 20 or flow of fluid pressure medium to the ram 21 is not in a linear relation to the displacement of the spool 24 in the transfer valve 11, and thus the rate of displacement of the control shaft 40 may not be linearly related to the displacement of the control surface 20. Generally, the gain of the manual control system is reduced as hydraulic center is approached. If we plot the flow of fluid pressure medium to the power ram 10, in gallons per minute as a function of the displacement of spool 24, a curved line would result. This curve for a typical transfer valve, is shown as curve B in FIGURE 2, where the curve B is plotted on the same vertical axis with the flow to the power ram vs. differential current.

Figure 2:
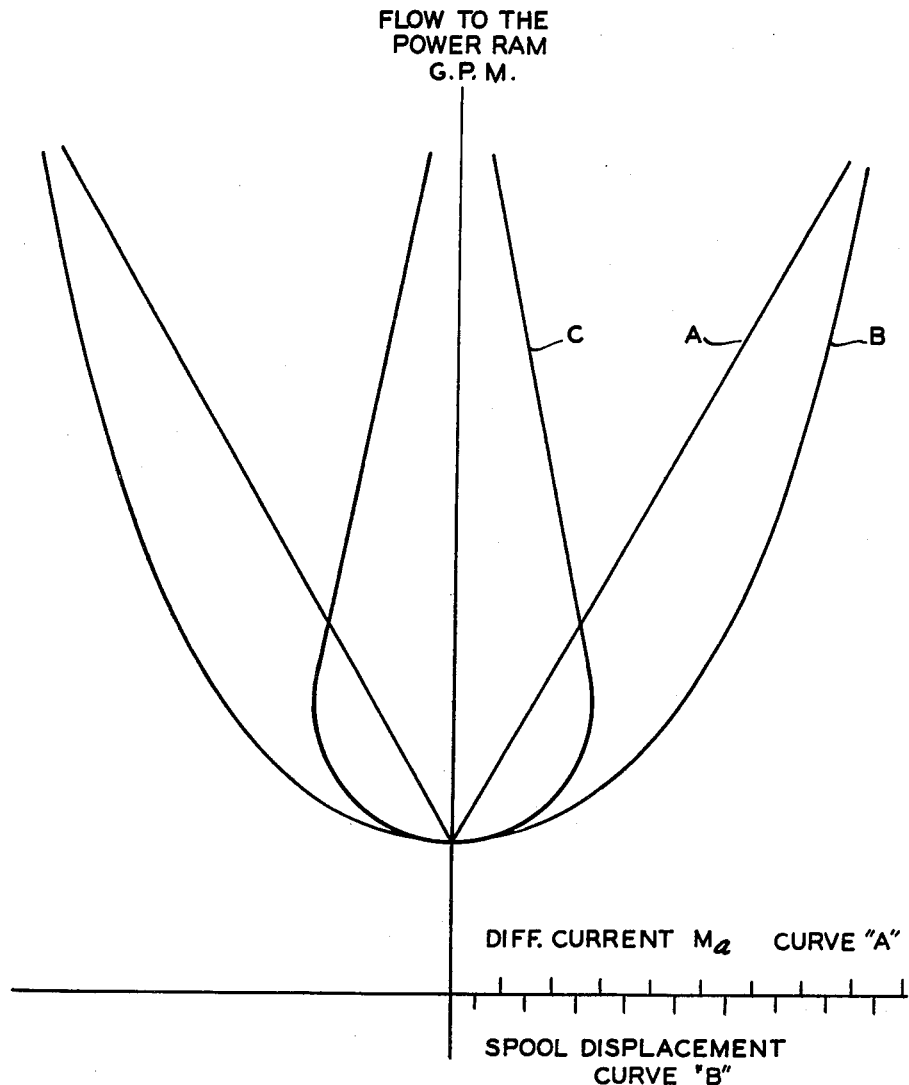
FIGURE 2 is a graph showing on the same ordinate the load flow characteristics of a typical manual transfer valve and the load flow characteristics from an automatic pilot.

The transfer valve 11 of the aircraft control system may be designed for optimum performance with either a human pilot, in which case the flow to the ram is a non-linear function of spool 24 displacement (curve B of FIGURE 2). Or, the transfer valve may be designed for optimum operation by the automatic pilot (curve A of FIGURE 2) and in which case the flow to the ram will be in a substantially linear relation to the rate of servo ram 13 output, viz. rate of servo rod 43 displacement.

The present invention is a means for changing the phase relationship of a transfer valve designed for optimum operation with an automatic pilot, so as to obtain optimum operation by a human pilot; and conversely, by a phase changing means, to obtain optimum operation by an automatic pilot of a transfer valve designed for use by a human pilot.

Figure 6:
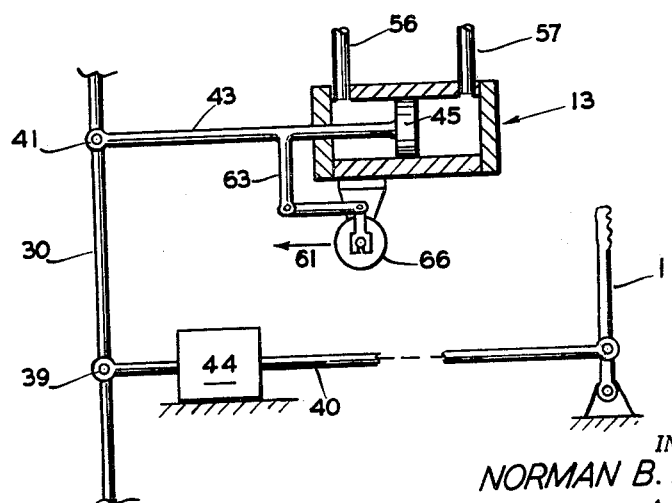
FIGURE 6 is a schematic drawing of the input to the operating linkage of an aircraft control system illustrating still another form of the invention.

This is accomplished by a cam mechanism 44 provided in series between the output rod 43 of the automatic pilot ram 45 and the input rod 42 to the linkage 12 or (as shown in FIGURE 6) between the output of the human pilot control stick 1, and the input to the transfer valve at pin 39.

Figure 3:
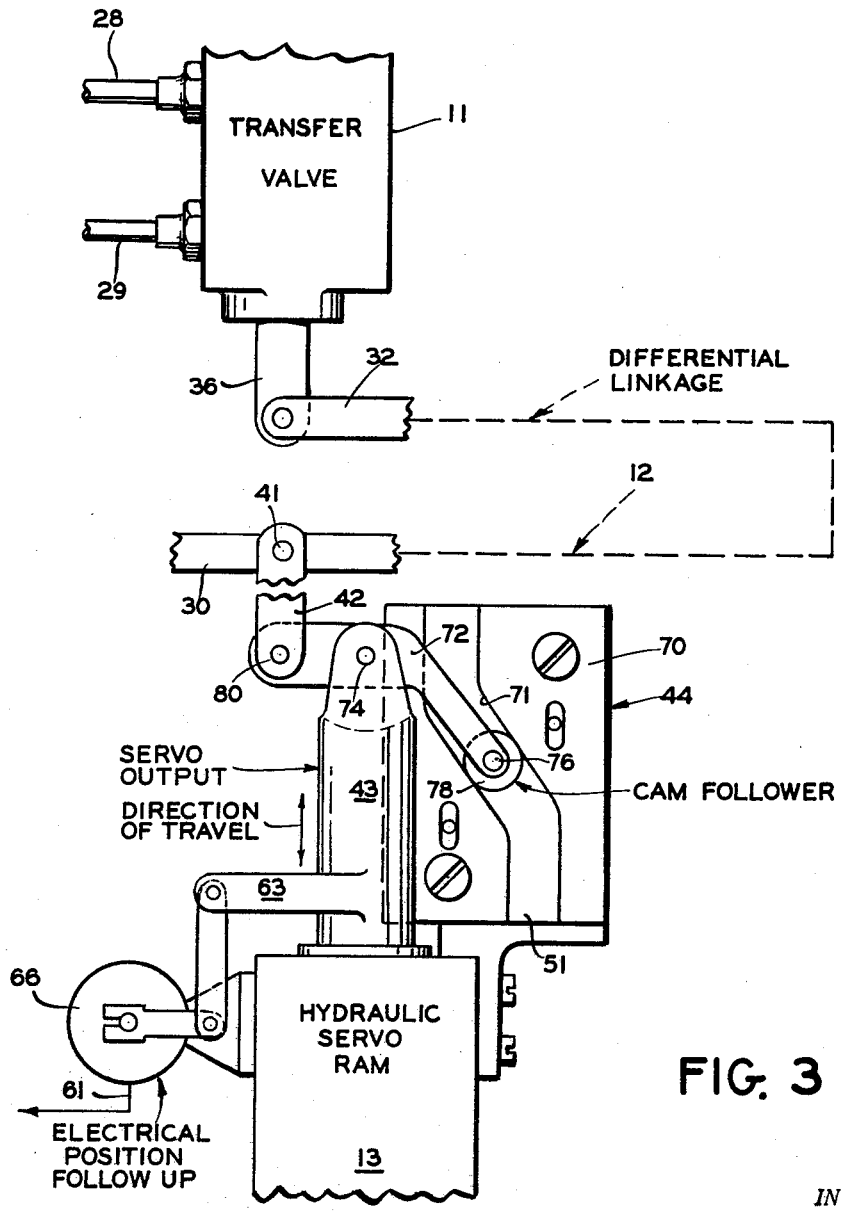
FIGURE 3 is a fragmentary view of operating linkage and parts embodying the present invention.

For a transfer valve 11, designed for operation by a human pilot, a cam mechanism 44, shown in FIGURE 3, is added between the output 43 of the automatic pilot servo ram 13 and the input 42 of the differential link 12, which connects to and operates the non-linear transfer valve 11.

The shape of the cam 44 may be determined as follows: a curve of the automatic pilot servo system showing flow of fluid pressure medium in gallons per minute under normal load to the power ram 10 vs. differential current applied to the electro-hydraulic servo valve 16, (for example, curve A on FIGURE 2) is plotted on the same ordinants with a load flow curve of the transfer valve 11 showing flow to the ram 10 in gallons per minute vs. spool 24 position (for example, curve B on FIGURE 2). There is also shown on FIGURE 2 a curve C, which represents the difference between curves A and B and the slope of the cam profile for any spool 24 position.

The correction cam mechanism 44 includes a cam plate 70 mounted on the housing of the servo ram 13 and having a channel cam profile 71 so formed as to match the curve C, its size being determined by the ratio of autopilot servo travel to travel of transfer valve spool 24.

A cam follower lever 72 is pivotally connected by a pin 74 at a point intermediate its opposite ends to a free end of the output rod 43 of the ram 45. There is further mounted at one end of the lever 72 by a pin 76 a cam follower roller 78 arranged in cooperative relation with the cam surface 71 while the opposite end of the lever 72 is pivotally connected by a pin 80 to the input rod 42 of the differential linkage 12.

The total rise of the cam profile 71 is so proportioned that it is equal to a full stroke of travel of the transfer valve 11 and the lever 72 cooperates with cam profile 71 as a follower as shown in FIGURE 3. The output of the servo to the input rod 42 of the linkage 12 will then be advanced or retarded in mechanical phase such that flow to the power ram 10 from the transfer valve 11 for the differential current applied to the electro-hydraulic servo valve, will be in a substantially linear relationship. For example, the relationship shown in curve A of FIGURE 2 is determined by considering the overall characteristics of the electro-hydraulic servo valve, differential link, and power boost as one unit. The input to this unit is a differential current from the automatic control system 2, and the output is flow of fluid pressure medium to the ram 10 or rate of displacement of the control surface 20. It is desired that the overall characteristics should be linear as per curve A of FIGURE 2.

Figure 4:
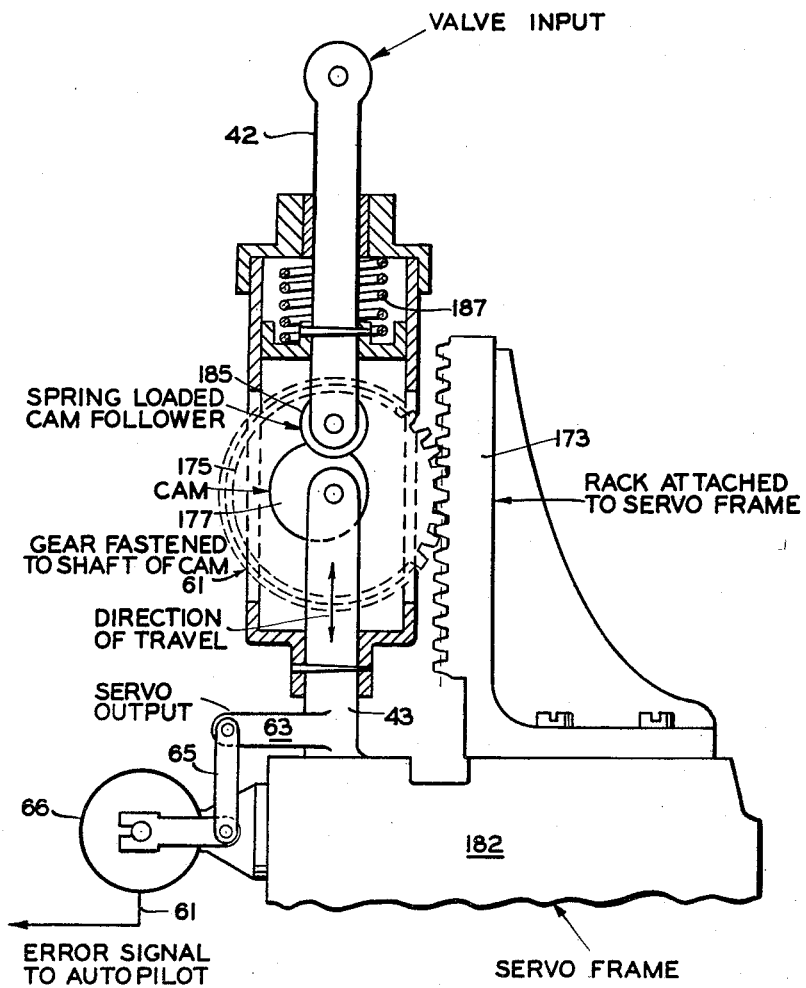
FIGURE 4 is a fragmentary sectional view of a second form of the invention.

The novel correctional cam mechanism 44 performs the necessary phase changing function and may be placed at any convenient position in the control loop. Because an error signal is fed from the output of the electro-hydraulic servo valve ram 40 to the automatic control, it is necessary that the non-linearity correction be placed so as not to interfere with the error signal, and thus is placed anywhere between the input to the transfer valve 11 and the point of measurement of the error signal on the output of the electro-hydraulic servo valve ram. In FIGURES 3 and 4, the correctional cam mechanism is operatively connected between the actuating rod 43 and the input 42 to the differential linkage 12.

It should be noted that the electrical error signal from the output of the electro-hydraulic servo ram 13 measures the rate of displacement, or rate of travel, of the servo output (shaft 43) directly, and does not measure the rate of travel or rate of displacement of the shaft 42. This is clearly shown by the electrical position follow-up 66 in the FIGURE 3 and which may be of a conventional type synchro or variable induction type transformer or slide wire potentiometer of conventional type to provide the desired electrical position follow-up signal to the automatic control system 2.

Figure 5:
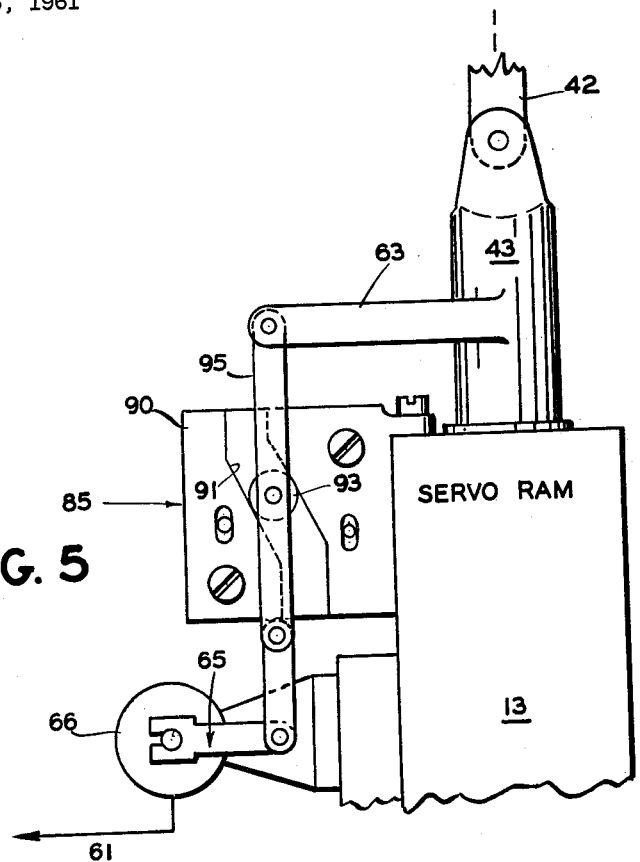
FIGURE 5 is a fragmentary sectional view of an alternative form of the invention.

Likewise, the correctional cam mechanism instead of being placed between the output or the servo ram and the input to the transfer valve, may be of the form indicated by the numeral 85 and placed between the output of the servo ram 13 and the input of shaft 65 of the electrical position follow-up, as shown in FIGURE 5. The correctional cam mechanism 85 may include a cam plate 90 mounted on the housing of the servo ram 13 and having a cam profile channel 91 so formed as to cooperate with a cam follower roller 93 and lever 95 operatively connected between arm 63 and input shaft 65 of the electrical follow-up 66 as to provide an error signal to the automatic control 2 from the output of the electro-hydraulic servo valve 16 that has the necessary proportionality with respect to the differential current applied to armature 53 so as to insure a linear relationship between the differential current applied to the armature 53 and the rate of flow to the power ram.

The present embodiment shows a single electrical position follow-up. In practice several follow-ups may be located at various points in the control loop and each follow-up may be equipped with a suitable correctional mechanism.

Another form of the invention is shown in FIGURE 4 where a rack 173 and pinion gear 175 are used to rotate a cam 177 which provides the necessary mechanical phase correction of the automatic pilot servo displacement. This arrangement is particularly apt where the transfer valve is operated through a differential link, of a conventional type, so as not to reflect inertial of the manual control system at servo output. At the end of the servo output shaft 43, there is fastened the cam 177 and pinion gear 175. The gear 175 engages the teeth on the rack 173 rigidly attached to frame 182 of the servo ram 13. The input rod 42 has rotatably mounted at its inner end a roller 185 loaded by a spring 187 which follows cam 177. Thus as the rod 43 moves back and forth as indicated by the double headed arrow thereon, the teeth on pinion gear 175 engage the teeth on rack 173 causing the attached cam 177 to rotate. The motion of cam 177 is followed by the cam follower 185 which causes a required displacement of the input shaft 42. The cam 177 being formed as described above so that a linear relation will exist between flow of fluid pressure medium to the power ram 10 and differential current applied to the first stage 17 armature 53 of FIGURE 1.

The present invention has been illustrated as correcting the phase between a manually designed transfer valve and an automatic pilot; the invention can equally well be used as a phase correcting device with a linear transfer valve where it might be placed between the human pilot controls 1 and the input of the linear transfer valve, as illustrated in FIGURE 6. The shape of the cam and structure and operation of the invention in this configuration may be similar to that which has been heretofore described and therefore no further explanation is deemed necessary.

While several embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In a hydraulic control system of a type including a first control system, a hydraulic power means designed for optimum control by said first control system, and a second control system having different operating characteristics from said first control system to alternatively control said hydraulic power means; the improvement comprising a motion changing means operatively connected between the output of the second control system and an input of the power means to correct for the different operating characteristics of said second control system whereby optimum control of the hydraulic power means may be effected by said second control system, said motion changing means including a housing operative means slidably mounted in the housing and controlled by the second system, a plate rigidly attached on the housing and having a cam surface and a channel, a cam follower roller mounted in the channel for traveling therein and making contact with the cam surface, a cam follower lever pivotally connected at a point to said cam follower roller, a rod longitudinally positioned by said operative means, said rod being slidably mounted with respect to the housing and pivotally connected to said cam follower lever at another point, and linkage operatively connected to the input of the hydraulic power means, said operative linkage being pivotally connected to said cam follower lever at still another point, so that longitudinal movement of the rod by said operative means angularly positions said cam follower lever relative to the channel to vary the position of the operative linkage in cooperative relation therewith to correct for the different operating characteristics of said second control system whereby optimum control of the hydraulic power means may be effected by said second control system.

2. In a hydraulic control system of a type including a first control system, a hydraulic power means designed for optimum control by said first control system, and a second control system having different operating characteristics from said first control system to alternatively control said hydraulic power means; the improvement comprising a motion changing means operatively connected between the output of the second control system and an input of the power means to correct for the different operating characteristics of said second control system whereby optimum control of the hydraulic power means may be effected by said second control system, said motion changing means including a housing, a piston slidably mounted in the housing and operatively controlled by said second system, a rod longitudinally positioned by the piston, a cam member rotatably mounted on said rod, a pinion gear rotatably mounted on said rod and fixedly attached to said cam member, another rod operatively connected to the input of the hydraulic power means, a roller rotatably mounted at an end of said other rod and positioned in cooperative relation with said cam member, spring loading means for maintaining said roller in contact with the rotatably mounted cam member, a rack gear fixedly mounted on said housing and operatively engaged with the pinion gear so that the longitudinal positioning of said first-mentioned rod by said piston angularly positions said cam member through said pinion gear to longitudinally position said other rod through said roller positioned in cooperative relation with said cam member to correct for the different operating characteristics of said second control system whereby optimum control of the hydraulic control means may be effected by said second control system.

3. A mechanical phase compensator comprising a housing, operative means slidably mounted in the housing, a plate rigidly attached on the housing and having a cam surface and a channel, a cam follower roller mounted in the channel for traveling therein and making contact with the cam surface, a cam follower lever pivotally connected at a point to said cam follower roller, a rod longitudinally positioned by said operative means, said rod being slidably mounted with respect to the housing and pivotally connected to said cam follower lever at another point, and an operative linkage pivotally connected to said cam follower lever at still another point, so that longitudinal movement of the rod by said operative means angularly positions said cam follower lever relative to the channel to vary the position of the operative linkage in cooperative relation therewith.

4. A mechanical phase compensator comprising a housing, a piston slidably mounted in the housing, a rod longitudinally positioned by the piston, a cam member rotatably mounted on said rod, a pinion gear rotatably mounted on said rod and fixedly attached to said cam member, another rod, a roller rotatably mounted at an end of said other rod and positioned in cooperative relation with said cam member, spring loading means for maintaining said roller in contact with the rotatably mounted cam member; and a rack gear fixedly mounted on said housing and operatively engaged with the pinion gear so that the longitudinal positioning of said first-mentioned rod by said piston angularly positions said cam member through said pinion gear to longitudinally position said other rod through said roller positioned in cooperative relation with said cam member.

5. In a hydraulic control system of a type including a first control system, a hydraulic power means designed for optimum control by said first control system, and a second control system having different operating characteristics from said first control system to alternatively control said hydraulic power means; the improvement comprising a motion changing means operatively connected between the output of the second control system and an input of the power means, said motion changing means including a housing, first operative means slidably mounted in the housing and controlled by said second system, a rod longitudinally positioned by the operative means, a cam member, a cam follower member, said rod being slidably mounted with respect to said housing, second operative means for varying the control of the hydraulic power means by said second control system, said second operative means being pivotally connected to said cam follower member, and means pivotally connecting said rod to one of said members so that longitudinal movement of the rod by said first operative means angularly positions said one member relative to said other member to adjustably position the second operative means in cooperative relation therewith to correct for the different operating characteristics of said second control system whereby optimum control of the hydraulic power means may be effected by said second control system.

References Cited in the file of this patent
UNITED STATES PATENTS

| 2,536,184 | Johnson | Jan. 2, 1951 |
| 2,940,964 | Barlow | June 14, 1960 |

FOREIGN PATENTS

| 722,138 | Germany | July 2, 1942 |